United States Patent
Kim et al.

(10) Patent No.: US 9,921,434 B2
(45) Date of Patent: Mar. 20, 2018

(54) LIQUID CRYSTAL DISPLAY DEVICE

(71) Applicant: Samsung Display Co. Ltd., Yongin (KR)

(72) Inventors: Hoon Kim, Ansan-si (KR); Kyeong Jong Kim, Suwon-si (KR); Ki Chul Shin, Seongnam-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 97 days.

(21) Appl. No.: 14/990,904

(22) Filed: Jan. 8, 2016

(65) Prior Publication Data

US 2016/0377932 A1    Dec. 29, 2016

(30) Foreign Application Priority Data

Jun. 26, 2015  (KR) .................. 10-2015-0090985

(51) Int. Cl.
*G02F 1/1362* (2006.01)
*G02F 1/1343* (2006.01)
*G02F 1/1333* (2006.01)
*G02F 1/1368* (2006.01)

(52) U.S. Cl.
CPC .. *G02F 1/134309* (2013.01); *G02F 1/136227* (2013.01); *G02F 1/136286* (2013.01); *G02F 2001/134345* (2013.01); *G02F 2001/136222* (2013.01); *G02F 2001/136295* (2013.01)

(58) Field of Classification Search
CPC ... G02F 2001/134345; G02F 1/133345; G02F 1/136227; G02F 1/134309
See application file for complete search history.

(56) References Cited

U.S. PATENT DOCUMENTS 6,104,450 A * 8/2000 Hiraishi ............ G02F 1/136213
                                                                 349/48
7,812,922 B2 * 10/2010 Chu .................. G02F 1/133788
                                                                349/123
(Continued)

FOREIGN PATENT DOCUMENTS

KR    1020040050623    6/2004
KR    1020090050795    5/2009
(Continued)

*Primary Examiner* — Michael Caley
*Assistant Examiner* — Jia Pan
(74) *Attorney, Agent, or Firm* — Cantor Colburn LLP

(57) ABSTRACT

A liquid crystal display device includes, a first insulation substrate, a first subpixel electrode disposed on the first insulation substrate, an insulation layer disposed on the first subpixel electrode, a second subpixel electrode disposed on the insulation layer, a liquid crystal layer disposed on the second subpixel electrode, a common electrode disposed on the liquid crystal layer, and a second insulation substrate disposed on the common electrode. In the liquid crystal display device, the second subpixel electrode and the common electrode are spaced apart by a second distance in a second region in which the second subpixel electrode is disposed, the first subpixel electrode and the common electrode are spaced apart by a first distance in a first region in which the first subpixel electrode is disposed, excluding the second region, and the first distance and the second distance are different from each other.

19 Claims, 14 Drawing Sheets

(56) References Cited

U.S. PATENT DOCUMENTS

| | | | |
|---|---|---|---|
| 2003/0038910 A1* | 2/2003 | Nagano | G02F 1/136209 349/113 |
| 2006/0221279 A1* | 10/2006 | Jeong | G02F 1/1343 349/114 |
| 2009/0161055 A1* | 6/2009 | Huang | G02F 1/134309 349/129 |
| 2010/0045915 A1* | 2/2010 | No | G02F 1/133514 349/138 |
| 2011/0170027 A1* | 7/2011 | Nakanishi | G02F 1/133707 349/33 |
| 2014/0267996 A1 | 9/2014 | Kim et al. | |

FOREIGN PATENT DOCUMENTS

| | | |
|---|---|---|
| KR | 1020120126223 | 11/2012 |
| KR | 1020150071772 | 6/2015 |

\* cited by examiner

LIQUID CRYSTAL DISPLAY DEVICE

This application claims priority to Korean Patent Application No. 10-2015-0090985 filed on Jun. 26, 2015, and all the benefits accruing therefrom under 35 U.S.C. § 119, the content of which in its entirety is incorporated herein by reference.

BACKGROUND

1. Technical Field

Embodiments of the invention relate to a liquid crystal display device.

2. Description of the Related Art

A liquid crystal display device is one of the currently most widely used types of flat panel display device, and may include electrodes for generating an electric field and a liquid crystal layer interposed between the electrodes. The liquid crystal display device display is typically configured to apply voltages to the electrodes to generate an electric field in the liquid crystal layer, which determines the alignment direction of liquid crystal molecules in the liquid crystal layer to control the polarization of incident light, thereby displaying desired images.

Among liquid crystal display devices, a vertically aligned mode liquid crystal display device, in which the major axes of the liquid crystal molecules are aligned vertical to upper and lower display panels in the absence of electric field, has high contrast ratio and wide reference viewing angle.

SUMMARY

A vertically aligned mode liquid crystal display may have lower side visibility than front visibility, and it is desired to improve the side visibility.

Embodiments of the inventive concept relate to a liquid crystal display device including a pixel capable of displaying images of different brightness in each region.

Embodiments of the inventive concept relate to a method of fabricating a liquid crystal display device including a pixel capable of displaying images of different brightness in each region.

According to an embodiment of the invention, a liquid crystal display device includes a first insulation substrate, a first subpixel electrode disposed on the first insulation substrate, an insulation layer disposed on the first subpixel electrode, a second subpixel electrode disposed on the insulation layer, a liquid crystal layer disposed on the second subpixel electrode, a common electrode disposed on the liquid crystal layer, and a second insulation substrate disposed on the common electrode. In such an embodiment, the second subpixel electrode and the common electrode are spaced apart by a second distance in a second region in which the second subpixel electrode is disposed, the first subpixel electrode and the common electrode are spaced apart by a first distance in a first region in which the first subpixel electrode is disposed, and the first distance and the second distance are different from each other.

According to another embodiment of the invention, a method of fabricating a liquid crystal display device includes preparing a first insulation substrate, providing a first subpixel electrode on the first insulation substrate, providing an insulation layer on the first subpixel electrode, and providing a second subpixel electrode on the insulation layer. In such an embodiment, the first subpixel electrode and the second subpixel electrode are provided in different layers from each other.

According to such embodiments, the pixel of the liquid crystal display device is configured to display different brightness in each region.

According to such embodiments, it is also possible to provide a method of fabricating a liquid crystal display device including a pixel capable of displaying images of different brightness in each region.

DETAILED DESCRIPTION

Figure 1:
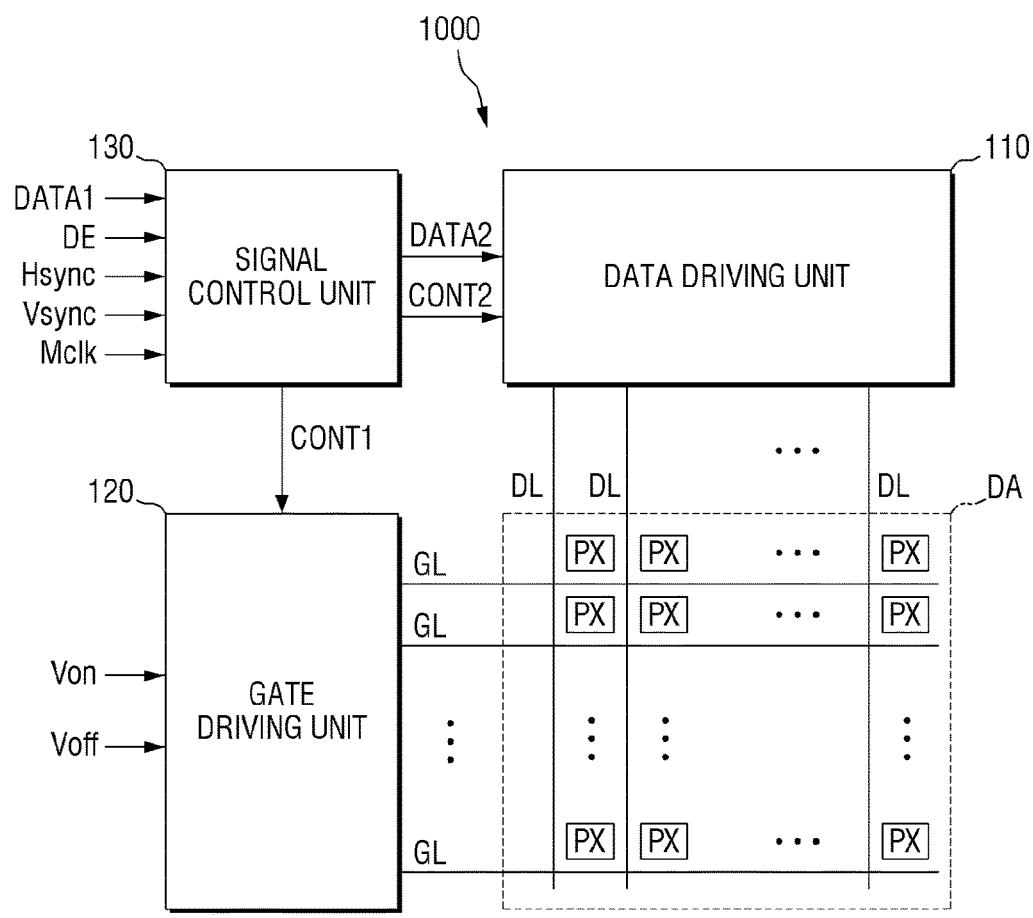
FIG. 1 is a block diagram of a liquid crystal display device according to an embodiment of the inventive concept.

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" or "approximately" can mean within one or more standard deviations, or within ±30%, 20%, 10%, 5% of the stated value.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments of the invention will hereinafter be described with reference to the accompanying drawings.

FIG. 1 is a block diagram of a liquid crystal display device according to an embodiment of the inventive concept.

Referring to FIG. 1, an embodiment of a liquid crystal display device 1000 may include a gate driving unit 120 (or a gate driver), a data driving unit 110 (or a data driver), a signal control unit 130 (or a signal controller) and a display unit DA (or a display panel or module).

The display unit DA may include a plurality of pixels PXs. The plurality of pixels PXs may be arranged substantially in a matrix from. The display unit DA may include a plurality of gate lines GLs extending in a first wiring direction, and a plurality of data lines DLs extending in a second wiring direction intersecting the first wiring direction.

The plurality of gate lines GLs may receive gate signals from the gate driving unit 120, and the plurality of data lines DLs may receive data signals from the data driving unit 110. The pixels PXs may be disposed in the respective regions defined by the gate lines GLs and the data lines DLs.

Each pixel PX may display one of primary colors to implement color display. In one embodiment, for example, the primary colors may include a red color, a green color and a blue color. Throughout the specification, a pixel which displays a red color will be referred to as a red pixel, a pixel which displays a green color will be referred to as a green pixel, and a pixel which displays a blue color will be referred to as a blue pixel. Three pixels having respective colors may be grouped into a unit pixel, and respective brightness of the pixels may be controlled to display a color image.

In an embodiment, the red pixel, the green pixel and the blue pixel may be arranged alternately in a row direction, but the disclosure is not limited thereto. In an alternative embodiment, the pixels may be arranged alternately in a column direction. Alternatively, the three pixels may be arranged at the respective vertices of a triangle. The pixels may be arranged in various other ways, and the disclosure is not limited to the pixel arrangement described above.

The signal control unit 130 may receive various signals from an external source to control the gate driving unit 120 and the data driving unit 110. In one embodiment, for example, the signal control unit 130 may receive, from an external source, input control signals for controlling first image data DATA1 and display thereof, and output a gate driving unit control signal CONT1, a data driving unit control signal CONT2, a second image data DATA2 and the like.

The first image data DATA1 may include information regarding the luminance of each pixel PX of the display unit DA. The luminance information may include a predetermined number of grayscale levels, for example, $1024(=2^{10})$, $256(=2^8)$ or $64(=2^6)$ grayscale levels, but the disclosure is not limited thereto, and the luminance information may include other values. The first image data DATA1 being input may be divided into frame units.

The input control signal provided to the signal control unit 130 may include, for example, a vertical synchronous signal Vsync, a horizontal synchronous signal Hsync, a main clock Mclk, a data enable signal DE and the like. However, the disclosure is not limited thereto, and the input control signal may include other types of signals.

The gate driving unit control signal CONT1 may be generated by the signal control unit 130 to control an operation of the gate driving unit 120. The gate driving unit control signal CONT1 may include a scan start signal, a clock signal and the like, but the disclosure is not limited thereto, and the gate driving unit control signal CONT1 may further include other signals. The gate driving unit 120 may generate a plurality of gate signals for activating each pixel PX of the display unit DA and provide the gate signals to a corresponding gate line GL among the plurality of gate lines GLs based on the gate driving unit control signal CONT1.

The data driving unit control signal CONT2 may be generated by the signal control unit 130 to control an operation of the data driving unit 110. The data driving unit 110 may generate a plurality of data signals and provide the data signals to the corresponding data line DL among the plurality of data lines DLs based on the data driving unit control signal CONT2.

Figure 2:
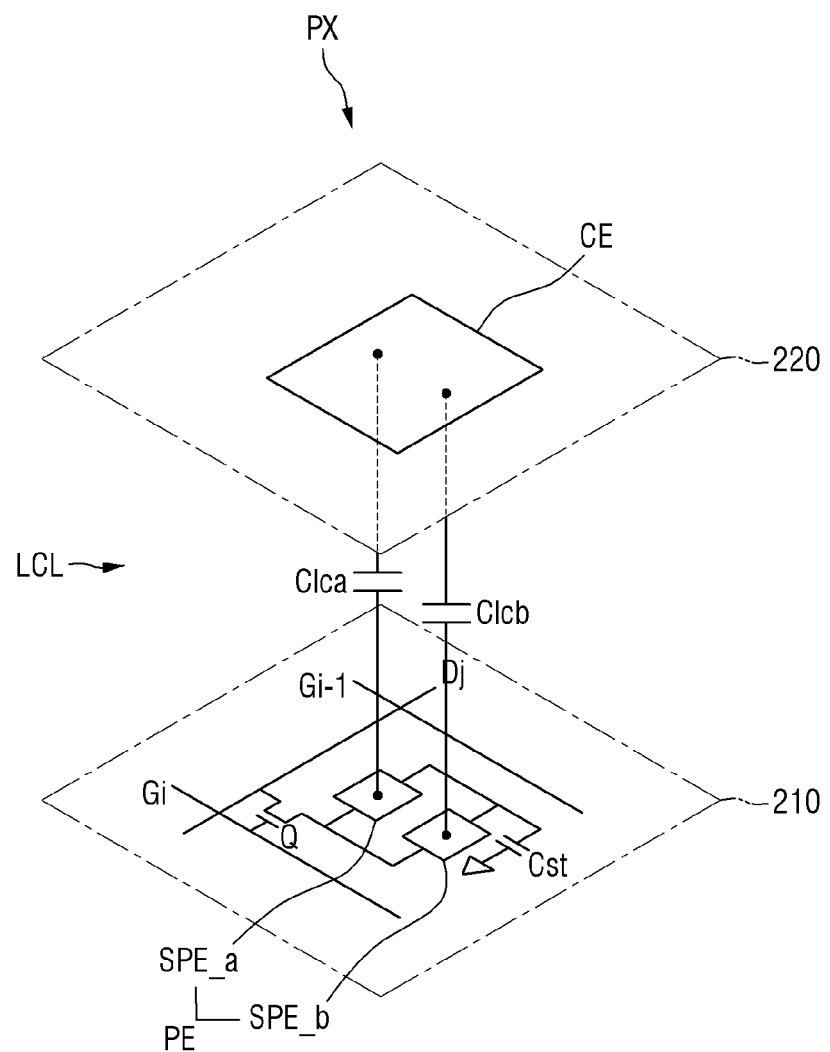
FIG. 2 is a schematic view illustrating the structure of one pixel of FIG. 1.

FIG. 2 is a schematic view illustrating the structure of one pixel of FIG. 1.

Referring to FIG. 2, in an embodiment, a pixel PX of the display unit DA may include a second insulation substrate 220 and a first insulation substrate 210 and a liquid crystal layer LCL interposed therebetween. The pixel PX may include a switching element Q connected to the corresponding gate line GL and the corresponding data line DL. The pixel PX may include a pixel electrode PE disposed on the first insulation substrate 210 and connected to the switching element Q.

The pixel electrode PE may include a first subpixel electrode SPE_a and a second subpixel electrode SPE_b. In such an embodiment, the pixel electrode PE and a common electrode CE disposed on the second insulation substrate 220 collectively define a liquid crystal capacitor Clc, and the pixel electrode PE may further define a storage capacitor Cst. In an alternative embodiment, the storage capacitor Cst may be omitted.

The switching element Q may be a tri-terminal element, e.g., a thin film transistor and the like, disposed on the first insulation substrate 210, and a control terminal thereof may be connected to a corresponding gate line GL, e.g., an i-th gate line Gi, an input terminal thereof may be connected to the corresponding data line DL, e.g., a j-th data line Dj, and an output terminal thereof may be connected to a first liquid crystal capacitor Clca, a second liquid crystal capacitor Clcb and the storage capacitor Cst. Herein, i and j are natural numbers.

The first liquid crystal capacitor Clca may include, as two terminals thereof, the first subpixel electrode SPE_a of the first insulation substrate 210 and the common electrode CE of the second insulation substrate 220, and the liquid crystal layer LCL between the first subpixel electrode SPE_a and the common electrode CE may serve as dielectrics. The first subpixel electrode SPE_a may be connected to the switching element Q, and the common electrode CE may be disposed on the whole surface of the second substrate 220 to receive a common voltage provided thereto.

The second liquid crystal capacitor Clcb may include, as two terminals thereof, the second subpixel electrode SPE_b of the first insulation substrate 210 and the common electrode CE of the second insulation substrate 220, and the liquid crystal layer LCL between the second subpixel electrode SPE_b and the common electrode CE may serve as dielectrics. The second subpixel electrode SPE_b may be connected to the switching element Q, and the common electrode CE may be disposed on the whole surface of the second substrate 220 to receive a common voltage provided thereto.

In an embodiment, the first subpixel electrode SPE_a, which is one terminal of the first liquid crystal capacitor Clca, and the second subpixel electrode SPE_b, which is one terminal of the second liquid crystal capacitor Clcb, may be connected to the output terminal of a same switching element Q. Thus, the same voltage may be provided to the first subpixel electrode SPE_a and the second subpixel electrode SPE_b. However, the intensity of the electric field generated in the liquid crystal layer LCL between the first subpixel electrode SPE_a and the common electrode CE and the intensity of the electric field generated in the liquid crystal layer LCL between the second subpixel electrode SPE_b and the common electrode CE may be different from each other because of the structural difference between the first subpixel electrode SPE_a and the second subpixel electrode SPE_b, which will be described later in greater detail, and thus the liquid crystal molecules LC in the liquid crystal layer LCL may be aligned at different angles in each region.

In an embodiment, the arrangement and structure of the common electrode CE and the pixel electrode PE are not limited to those shown in FIG. 2, and in an alternative embodiment, the common electrode CE may be provided on the first insulation substrate 210. At least either the pixel electrode PE or the common electrode CE may have a certain pattern for controlling the liquid crystal layer LCL. The pattern of the pixel electrode PE and the common electrode CE will be described later in detail.

The storage capacitor Cst which serves to assist the liquid crystal capacitor Clc may be formed by overlapping, or defined by overlapping portions of, a separate signal line (not shown) and the pixel electrode PE on the first insulation substrate 210 with an insulator therebetween, and a predetermined voltage such as the common voltage may be provided to such a separate signal line (not shown).

As described above with reference to FIG. 1, each pixel PX may display one of primary colors to achieve color display. In such an embodiment, a color filter (not shown) may be on at least either the second insulation substrate 220 or the first insulation substrate 210 to achieve color display.

Figure 3:
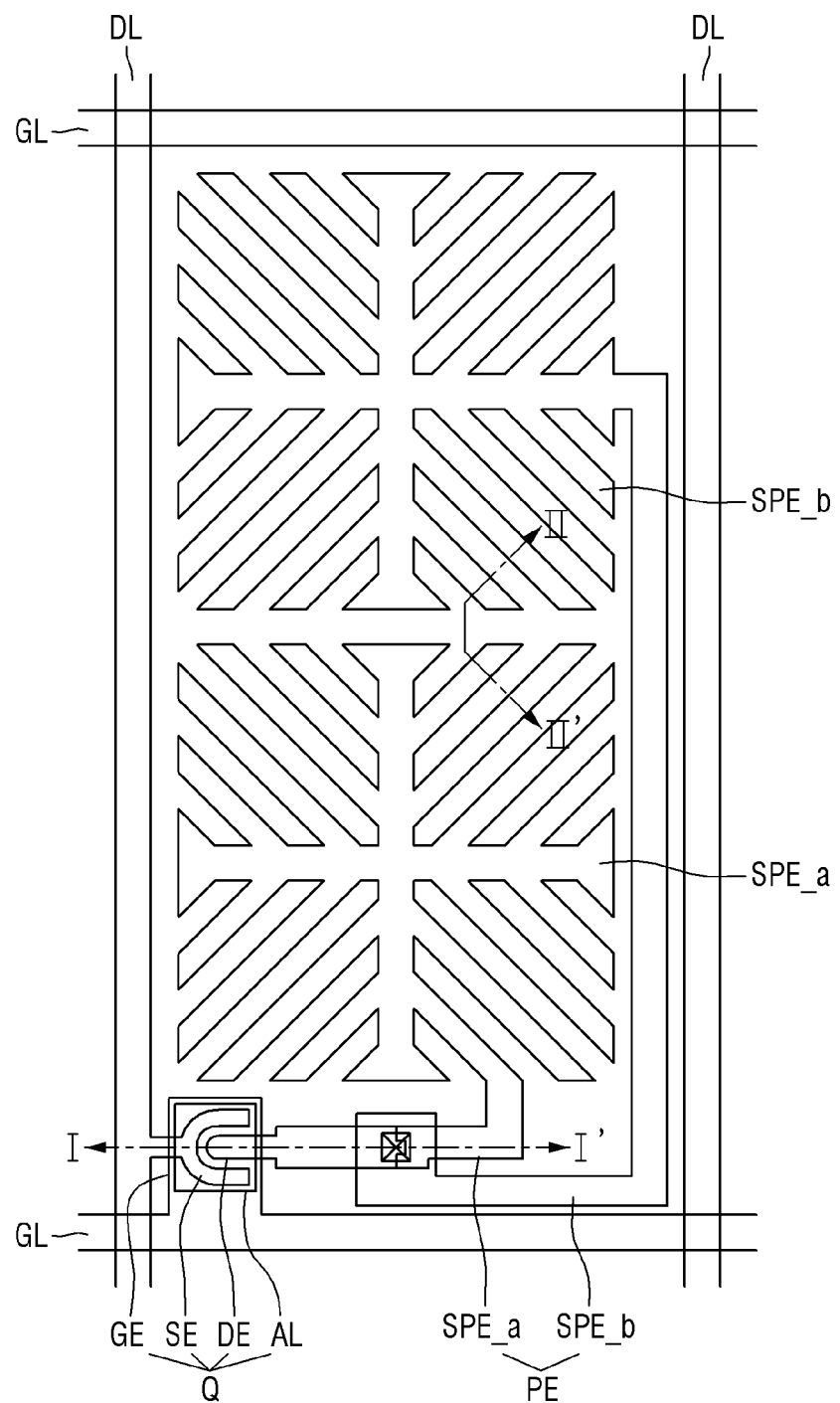
FIG. 3 is a plan view of one pixel of the liquid crystal display device according to an embodiment of the inventive concept.
Figure 4:
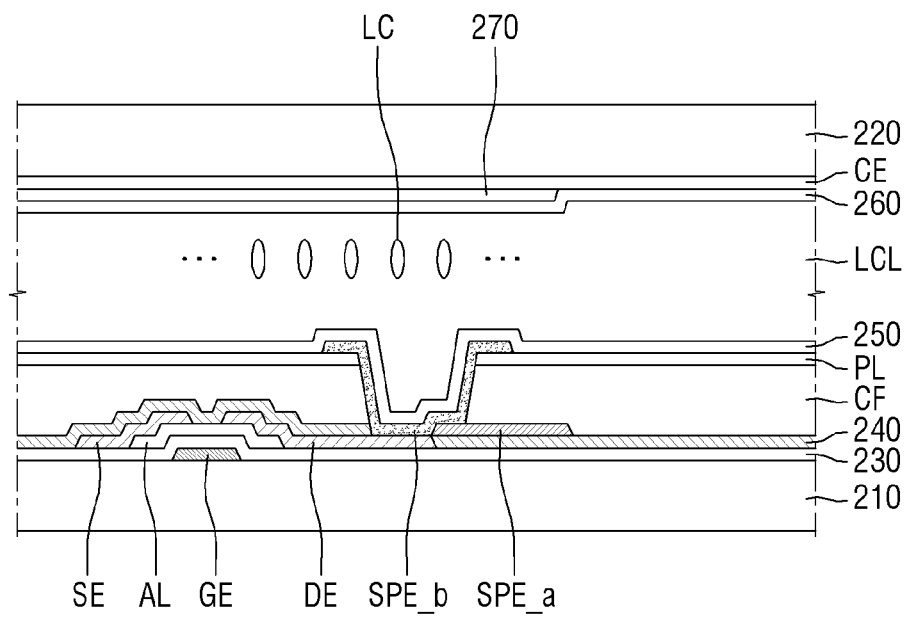
FIG. 4 is a cross-sectional view taken along line I-I' of FIG. 3.

FIG. 3 is a plan view of one pixel of the liquid crystal display device according to an embodiment of the inventive concept. FIG. 4 is a cross-sectional view taken along line I-I' of FIG. 3.

Referring to FIG. 3 and FIG. 4, an embodiment of the liquid crystal display device 1000 may include the first insulation substrate 210 and the second insulation substrate 220 opposite to, e.g., facing, each other, and the liquid crystal layer LCL interposed between the two substrates.

The gate line GL and a gate electrode GE connected to the gate line GL may be disposed on the first insulation substrate 210. A first insulation layer 230 may be disposed on the gate line GL and the gate electrode GE.

A semiconductor layer AL may be disposed on the first insulation layer 230. The semiconductor layer AL may overlap the gate electrode GE. Although not shown, an ohmic contact member may be disposed on the semiconductor layer AL. The semiconductor layer AL may include or be made of a semiconductor material such as amorphous silicon, an oxide semiconductor or the like to pass or block current depending on the voltage provided to the gate electrode GE. The ohmic contact member may include or be made of an impurity-doped semiconductor material to enable ohmic contacts among the upper source electrode SE, the drain electrode DE and the lower semiconductor layer AL.

The data line DL, the source electrode SE and the drain electrode DE may be disposed on the semiconductor layer AL and the first insulation layer 230. The source electrode SE may be connected to the data line DL and disposed on the semiconductor layer AL. The drain electrode DE may be disposed on the semiconductor layer AL and spaced apart from the source electrode SE. When a channel is formed in the semiconductor layer AL by applying a gate-on voltage to the gate electrode GE, the data voltage provided to the data line DL may be provided to the drain electrode DE through the source electrode SE and the semiconductor layer AL.

A second insulation layer 240 may be disposed on the data line DL, the source electrode SE and the drain electrode DE, and the first subpixel electrode SPE_a may be disposed on the second insulation layer 240.

The second insulation layer 240 may separate or insulate the components or layers therebeneath from the first subpixel electrode SPE_a, excluding a region in which a contact hole CH is defined. However, in some embodiments, the second insulation layer 240 may be omitted depending on the arrangement of the first subpixel electrode SPE_a.

A third insulation layer CF may be disposed on the first subpixel electrode SPE_a. The third insulation layer CF may insulate the first subpixel electrode SPE_a from other components or layer above the first subpixel electrode SPE_a, and may have a flat surface.

In such an embodiment, the third insulation layer CF may include or be formed of a color filter layer CF including a plurality of color filters. The color filters may have properties of passing only light in a specific wavelength range, and the color filters may pass light in different wavelength ranges for respective pixels.

In one embodiment, for example, the color filter layer CF may include a red color filter for passing light in a wavelength range corresponding to red light, a green color filter for passing light in a wavelength range corresponding to green light, a blue color filter for passing light in a wavelength range corresponding to blue light, and the like. In such an embodiment, the red color filter may pass light in an approximately 580 nanometers (nm) to 780 nm wavelength range and reflect light of the other wavelength range, the green color filter may pass light in an approximately 450 nm to 650 nm wavelength range and reflect light of the other wavelength range, and the blue color filter may pass light in an approximately 380 nm to 560 nm wavelength range and reflect light of the other wavelength range.

The color filter layer CF may include or be made of pigment or a photosensitive organic matter presenting red, green and blue colors, however, the colors of light passed through the color filter layer CF are not limited to red, green and blue colors, and a material which passes light having wavelength ranges of other colors may be used. The color filter layer may pass light of all wavelength ranges to present a transparent color.

A passivation layer PL may be disposed on the color filter layer CF. The passivation layer PL may include an inorganic insulation material or an organic insulation material.

The passivation layer PL may inhibit the liquid crystal layer LCL from being contaminated by an organic matter such as a solvent introduced from the color filter layer CF, thereby effectively preventing an afterimage which might otherwise occur during an operation of a screen.

In an embodiment, the passivation layer PL may include or be formed a laminate of two or more layers. In one embodiment, for example, the passivation layer PL may include a first passivation layer (not shown) including or made of an inorganic insulation material as a lower layer, and a second passivation layer (not shown) including or made of an organic insulation material disposed on the first passivation layer as an upper layer.

In an embodiment of the liquid crystal display device 1000, as shown in FIG. 4, the surface of the third insulation layer CF may be a flat surface, but not being limited thereto.

In an alternative embodiment, the surface of the third insulation layer CF may not be flat. In such an embodiment, the passivation layer PL may serve to flatten the surface of the third insulation layer CF.

The contact hole CH for exposing a part of the drain electrode DE of the switching element Q and a part of the first subpixel electrode SPE_a, and the second subpixel electrode SPE_b may be defined or formed through the passivation layer PL. The second subpixel electrode SPE_b may have a specific pattern on the passivation layer PL. In an embodiment, the second subpixel electrode SPE_b may be connected to the drain electrode DE and the first subpixel electrode SPE_a exposed by the contact hole CH in the region where the contact hole CH is defined, and may provide the voltage provided through the drain electrode DE to the first subpixel electrode SPE_a. In one embodiment, for example, the drain electrode DE and the second subpixel electrode SPE_b may be physically interconnected, the second subpixel electrode SPE_b and the first subpixel electrode SPE_a may be physically interconnected, and all of the drain electrode DE, the first subpixel electrode SPE_a and the second subpixel electrode SPE_b may be electrically interconnected.

In an embodiment, the connection among the drain electrode DE, the first subpixel electrode SPE_a and the second subpixel electrode SPE_b is not limited thereto, and alternatively, the drain electrode DE, the first subpixel electrode SPE_a and the second subpixel electrode SPE_b may be interconnected with one another via other configurations. In one alternative embodiment, for example, a first contact hole (not shown) may be defined to interconnect the drain electrode DE and the second subpixel electrode SPE_b, and a second contact hole (not shown) may be defined to interconnect the second subpixel electrode SPE_b and the first subpixel electrode SPE_a, thus electrically interconnecting the drain electrode DE, the first subpixel electrode SPE_a and the second subpixel electrode SPE_b. In such an embodiment, the first and second contact holes (not shown) may be spaced apart from each other.

A first alignment layer 250 may be disposed on the second subpixel electrode SPE_b. The first alignment layer 250 may be a vertical alignment layer. The first alignment layer 250 may have a predetermined pretilt angle. In such an embodiment, in a state in which an electric field is absent between the pixel electrode PE including the first and second subpixel electrodes SPE_a and SPE_b and the common electrode CE, the liquid crystal molecules LC provided on the first alignment layer 250 may pretilt at an angle in a range of about 1° to about 10° from the direction vertical to the first alignment layer 250.

In an embodiment, the common electrode CE may be disposed on (beneath) the second insulation substrate 220. The common electrode CE may cooperate with the first subpixel electrode SPE_a or the second subpixel electrode SPE_b to generate an electric field in the liquid crystal layer LCL.

A light blocking member 270 may be disposed on (beneath) the common electrode CE. The light blocking member 270 may serve to block light, and may be arranged into a lattice or have a web-like or net-like shape. The light blocking member 270 may be arranged to overlap substantially an entire region expect a region, in which the pixel electrode PE is disposed, to prevent light leakage. In an alternative embodiment, the light blocking member 270 may be disposed on the first insulation substrate 210.

A second alignment layer 260 may be disposed on (beneath) the light blocking member 270. The second alignment layer 260 may perform a same function as that of the first alignment layer 250.

Although in an embodiment, the second insulation substrate 220, the common electrode CE, the light blocking member 270 and the second alignment layer 260 may be disposed one on another as shown in FIG. 4, however, such an arrangement is merely exemplary and may vary depending on a design.

The liquid crystal layer LCL may be disposed in a region between the first insulation substrate 210 and the second insulation substrate 220, and control the intensity of light passing through the liquid crystal layer LCL. The liquid crystal layer LCL may include a plurality of liquid crystal molecules LC having a dielectric anisotropy. The liquid crystal molecules LC may have a negative dielectric anisotropy such that the applied electric field and the major axes of the liquid crystal molecules LC may be arranged vertically to each other. However, the disclosure is not limited thereto, and alternatively, the liquid crystal molecules LC may have a positive dielectric anisotropy such that the applied electric field and the major axes of the liquid crystal molecules LC may be arranged in parallel with each other.

In an embodiment, the liquid crystal molecules LC may tilt to some extent by the second alignment layer 260 and the first alignment layer 250, however, the liquid crystal molecules LC may be vertically aligned between the first insulation substrate 210 and the second insulation substrate 220 in the direction substantially vertical to the first and second insulation substrates 210 and 220, e.g., surfaces thereof that face each other.

When an electric field is applied between the first insulation substrate 210 and the second insulation substrate 220, the liquid crystal molecules LC may be re-aligned in a specific direction, and the polarization of the light passing through the re-aligned liquid crystal molecules LC may change by the optical anisotropy of the re-aligned liquid crystal molecules LC. Accordingly, the light may be transmitted or blocked by a polarizer (not shown) disposed on the first insulation substrate 210 and the second insulation substrate 220. The term "re-aligned" as used herein may mean that mainly the liquid crystal molecules LC may lie in the direction vertical to the first insulation substrate 210 or the second insulation substrate 220.

Although in the drawings the first subpixel electrode SPE_a and the second subpixel electrode SPE_b are depicted as being sequentially disposed in a vertical direction, the arrangement thereof may vary to any degree.

In an embodiment, the first subpixel electrode SPE_a and the second subpixel electrode SPE_b may have respective patterns in the respective square regions, as shown in FIG. 3, but the disclosure is not limited thereto, and each of the first subpixel electrode SPE_a and the second subpixel electrode SPE_b may be formed into a plurality of patterns (not shown) in a plurality of regions. In an embodiment, the patterns (not shown) of the first subpixel electrode SPE_a may be physically interconnected, and the patterns (not shown) of the second subpixel electrode SPE_b may also be physically interconnected.

In an embodiment, the area of the first subpixel electrode SPE_a and the area of the second subpixel electrode SPE_b occupying in one pixel PX region may be substantially the same as each other as shown in FIG. 3, but not being limited thereto. In an alternative embodiment, the area of the first subpixel electrode SPE_a may be larger or smaller than the area of the second subpixel electrode SPE_b.

Each of the first subpixel electrode SPE_a and the second subpixel electrode SPE_b may have a predetermined pattern. The rearrangement direction of the liquid crystal molecules LC overlapping the first subpixel electrode SPE_a and the second subpixel electrode SPE_b may vary in each region depending on the pattern structure of each of the first subpixel electrode SPE_a and the second subpixel electrode SPE_b, and such various rearrangement directions of the liquid crystal molecules LC in each region may improve side visibility.

In an embodiment, as shown in FIG. 3, each of the first subpixel electrode SPE_a and the second subpixel electrode SPE_b may have a shape including a cross-shaped stem in the center region thereof and branches extending in four different directions from the stem. Thus, in such an embodiment, side visibility may be improved. However, the disclosure is not limited thereto, and the pattern of the pixel electrode PE may vary to any degree.

In an embodiment, the second subpixel electrode SPE_b may receive a voltage from the drain electrode DE of the switching element Q, and the first subpixel electrode SPE_a may receive a voltage from the second subpixel electrode SPE_b such that the first subpixel electrode SPE_a and the second subpixel electrode SPE_b may receive the same voltage. However, the intensity of the electric field generated in the liquid crystal layer LCL overlapping the first subpixel electrode SPE_a and the intensity of the electric field generated in the liquid crystal layer LCL overlapping the second subpixel electrode SPE_b may be different from each other due to the structural difference between the first subpixel electrode SPE_a and the second subpixel electrode SPE_b. This will hereinafter be described in greater detail with reference to FIG. 5.

Figure 5:
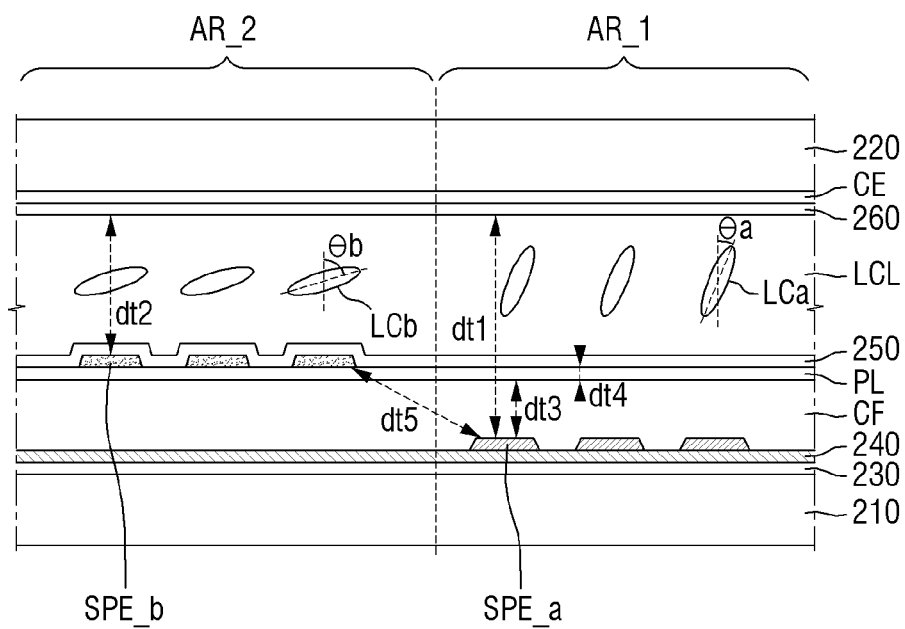
FIG. 5 is a cross-sectional view taken along line of FIG. 3.

FIG. 5 is a cross-sectional view taken along line II-II' of FIG. 3.

Referring to FIG. 5, in an embodiment, the first subpixel electrode SPE_a may be disposed on the third insulation layer CF, and the second subpixel electrode SPE_b may be disposed beneath the third insulation layer CF. Thus, a first distance dt1, which is a distance between the first subpixel electrode SPE_a and the common electrode CE in a thickness direction of the display unit DA, may be longer than a second distance dt2, which is a distance between the second subpixel electrode SPE_b and the common electrode CE in the thickness direction of the display unit DA. In such an embodiment, the difference between the first distance dt1 and the second distance dt2 may be the sum of a third distance dt3, which is a distance between the surface of the third insulation layer CF to the first subpixel electrode SPE_a in the thickness direction of the display unit DA, and a thickness dt4 of the passivation layer PL. However, in an alternative embodiment, where the liquid crystal display device 1000 further includes an additional component or layer between the layer of the first subpixel electrode SPE_a and the layer of the second subpixel electrode SPE_b, the difference may increase by the thickness of the additional component or layer.

In an embodiment, in a pixel region, the region overlapping the second subpixel electrode SPE_b may be defined as a second region AR2, and the region overlapping the first subpixel electrode SPE_a, e.g., a region of the pixel region excluding the second region AR2, may be defined as a first region AR1. In such an embodiment, the intensity of the electric field in the liquid crystal layer LCL disposed in the first region AR1 and the intensity of the electric field in the liquid crystal layer LCL disposed in the second region AR2 may be different from each other, and the degree of tilt of the liquid crystal molecules LC in the first region AR1 and the degree of tilt of the liquid crystal molecules LC in the second region AR2 may be different from each other. As a result, in such an embodiment, although the same voltage is provided to the first subpixel electrode SPE_a and the second subpixel electrode SPE_b, the brightness in the first region AR1 and the brightness in the second region AR2 may be different from each other.

When an electric field is generated between two electrodes having a potential difference therebetween, and the intensity of the electric field is in proportional to the intensity of voltage and in inversely proportional to the distance between the two electrodes. In an embodiment, since the same voltage is applied to the first subpixel electrode SPE_a and the second subpixel electrode SPE_b, the difference in the intensities of electric fields caused due to the voltage may not occur. However, in such an embodiment, since the first distance dt1 is longer than the second distance dt2, the intensity of the electric field generated in the liquid crystal layer LCL in the first region AR1 may be smaller than the intensity of the electric field generated in the liquid crystal layer LCL in the second region AR2.

The liquid crystal molecules LC in the liquid crystal layer LCL may tilt further and transmit large quantity of light as the intensity of the acting electric field is higher, and may tilt less and transmit small quantity of light as the intensity of the acting electric field is lower. Thus, a first angle θa which is an angle between the major axes of liquid crystal molecules LCa of the liquid crystal layer LCL disposed in the first region AR1 and an axis (or a direction) vertical to the first insulation substrate 210 may be smaller than a second angle θb which is an angle between the major axes of liquid crystal molecules LCb of the liquid crystal layer LCL disposed in the second region AR2 and the axis (or the direction) vertical to the first insulation substrate 210, leading to a bright difference between the two regions AR1 and AR2. Thus, in such an embodiment, side visibility in the liquid crystal display device 1000 may be improved. Herein, the axis or direction vertical to a substrate may means an axis or a direction parallel to a thickness direction of the substrate.

When the third insulation layer CF interposed between the first subpixel electrode SPE_a and the second subpixel electrode SPE_b is a color filter layer CF, a sufficient distance may be secured between the first subpixel electrode SPE_a and the second subpixel electrode SPE_b due to the thickness of the color filter layer CF. In such an embodiment, the thickness of the color filter layer CF may be thicker than those of other components of the liquid crystal display device 1000, for example, the first and second insulation layers 240, the passivation layer PL and the like. In one embodiment, for example, the liquid crystal layer LCL, the color filter layer CF, and the passivation layer PL interposed therebetween may have thicknesses in a ratio of about 1:1:0.03. In such an embodiment, when the liquid crystal molecules LC has a thickness of about 3 μm, the color filter layer CF may have a thickness of about 3 μm and the passivation layer PL may have a thickness of about 0.1 μm. Thus, the occurrence of the parasitic capacitance between the first subpixel electrode SPE_a and the second subpixel electrode SPE_b may be suppressed as much as possible.

Specifically, the thickness of the color filter layer CF and the thickness of the liquid crystal layer LCL may not be significantly different from each other. Thus, the distance dt5 between the first subpixel electrode SPE_a and the second subpixel electrode SPE_b may be sufficiently ensured when the color filter layer CF is provided between the first subpixel electrode SPE_a and the second subpixel electrode SPE_b than providing the passivation layer PL, the first alignment layer 250 or the like between the first subpixel electrode SPE_a and the second subpixel electrode SPE_b. Thus, the occurrence of the parasitic capacitance between the first subpixel electrode SPE_a and the second subpixel electrode SPE_b may be effectively prevented or suppressed.

In an embodiment, the first subpixel electrode SPE_a and the second subpixel electrode SPE_b may not overlap each other as shown in FIG. 5, but the disclosure is not limited thereto. In an alternative embodiment, the first subpixel electrode SPE_a and the second subpixel electrode SPE_b may overlap each other in a partial region. However, the region in which the second subpixel electrode SPE_b is disposed may not overlap all of the regions in which the first subpixel electrode SPE_a is disposed, and thus the region may be divided into the first region AR1 and the second region AR2. In such an embodiment, the first region AR1 and the second region AR2 may present brightness different from each other.

Figure 6:
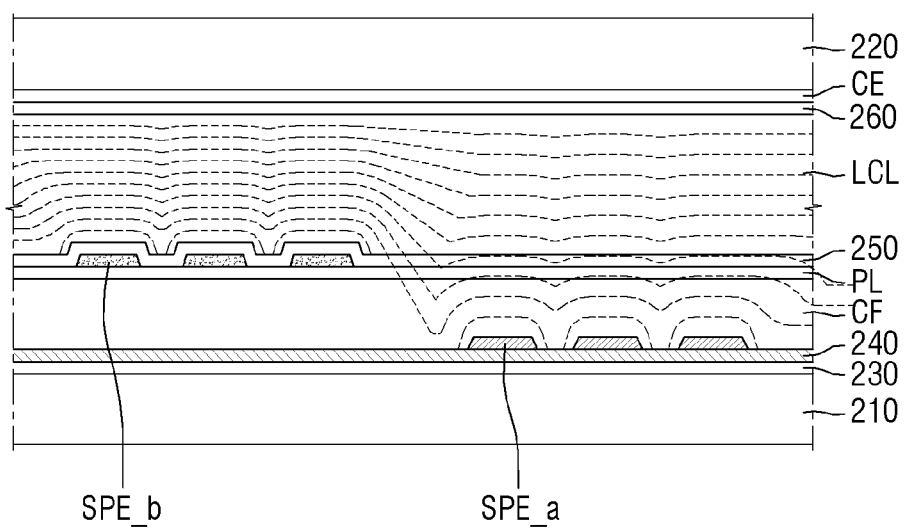
FIG. 6 is a cross-sectional view taken along line II-II' of FIG. 3 in which equipotential lines are shown.

FIG. 6 is a cross-sectional view taken along line II-II' of FIG. 3 in which equipotential lines are shown.

Referring to FIG. 6, the number of the equipotential lines formed in the liquid crystal layer LCL in the region overlapping the second subpixel electrode SPE_b may be larger than the number of the equipotential lines formed in the liquid crystal layer LCL in the region overlapping the first subpixel electrode SPE_a. In general, since the more the equipotential lines are formed in the same region, the higher the intensity of the electric field becomes, the intensity of the electric field generated in the liquid crystal layer LCL in the region overlapping the second subpixel electrode SPE_b is higher than the intensity of the electric field generated in the liquid crystal layer LCL in the region overlapping the first subpixel electrode SPE_a.

Thus, two regions AR1 and AR2 which present different brightness even when the same voltage is provided from the data line DL may be formed in one pixel PX. Further, side visibility may be improved. The degree of the improvement in side visibility will hereinafter be described in detail with reference to FIG. 7.

Figure 7:
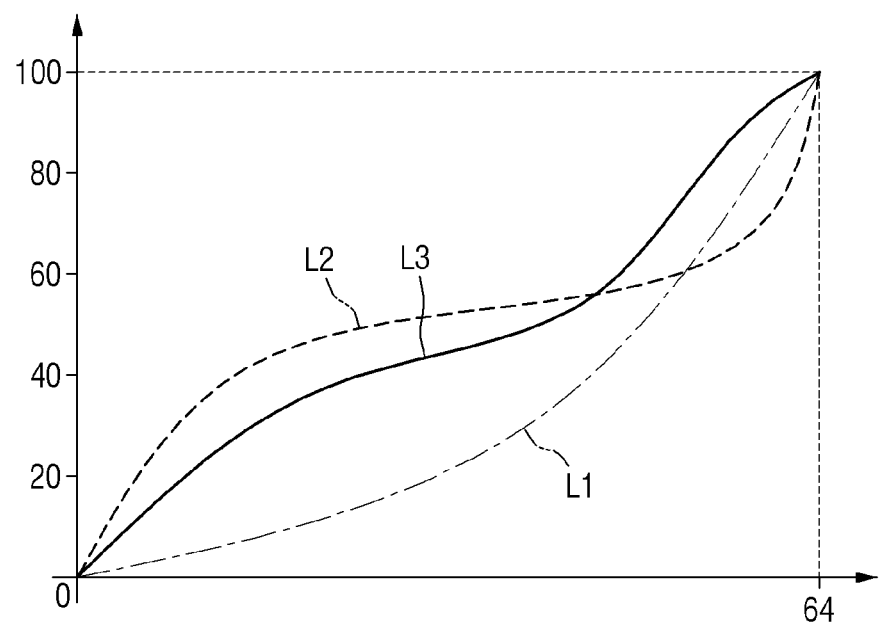
FIG. 7 is a graphical representation of visibility depending on viewing angles.

FIG. 7 is a graphical representation of visibility depending on viewing angles.

Referring to FIG. 7, the horizontal axis may denote the grayscale to be presented by a pixel PX, and the grayscale may have a certain unit or value, and the maximum value of the grayscale is illustrated as 64. The vertical axis may denote brightness with a unit of percentage.

A first indication line L1 depicted as a dashed dotted line may denote brightness for each grayscale when the pixel PX is viewed from the front, and the brightness may increase relatively gently with the increase of the grayscale.

A second indication line L2 depicted as a two point chain line may denote brightness of each grayscale when the pixel PX is viewed at a side angle of about 60°, where the pixel has a structure in which the distance between the first subpixel electrode SPE_a and the common electrode CE and the distance between the second subpixel electrode SPE_b and the common electrode CE are the same as each other. The second indication line L2 may indicate that the brightness may suddenly increase/decrease in response to the small grayscale increase/decrease in the grayscale having a small value, the brightness may not significantly change as compared with the grayscale increase/decrease in the grayscale having an intermediate value, and the brightness may suddenly increase/decrease again in response to the small grayscale increase/decrease in the grayscale having a large value. Thus, the second indication line L2 may have a larger-scale variation when compared with the first indication line L1, which causes a viewing difference when one pixel PX is viewed from the front and from the side although the same grayscale is expressed.

A third indication line L3 depicted as a solid line may denote brightness of each grayscale when the pixel PX is viewed at a side angle of about 60°, where the pixel has a structure of the first subpixel electrode SPE_a and the second subpixel electrode SPE_b shown in FIG. 5. The third indication line L3 may have a variation further similar to those of the first indication line contrary to the second indication line L2. Thus, the pixel having a structure of the first subpixel electrode SPE_a and the second subpixel electrode SPE_b shown in FIG. 5 may be viewed similarly when viewed from the front and from the side, thereby improving visibility.

A method of fabricating a liquid crystal display device according to an embodiment of the inventive concept will be described hereinafter.

Figure 13:
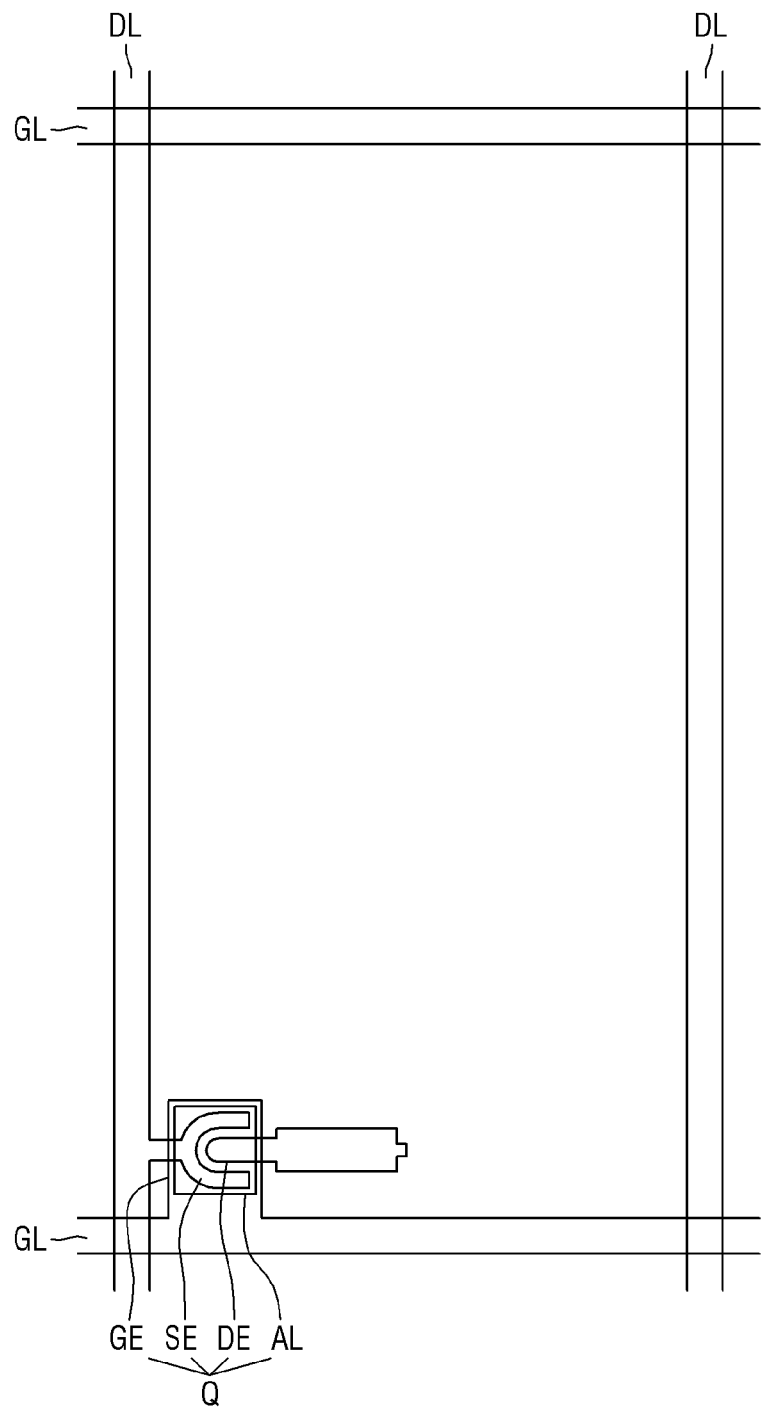
FIG. 13 is a plan view of a pixel shown in FIG. 8.
Figure 14:
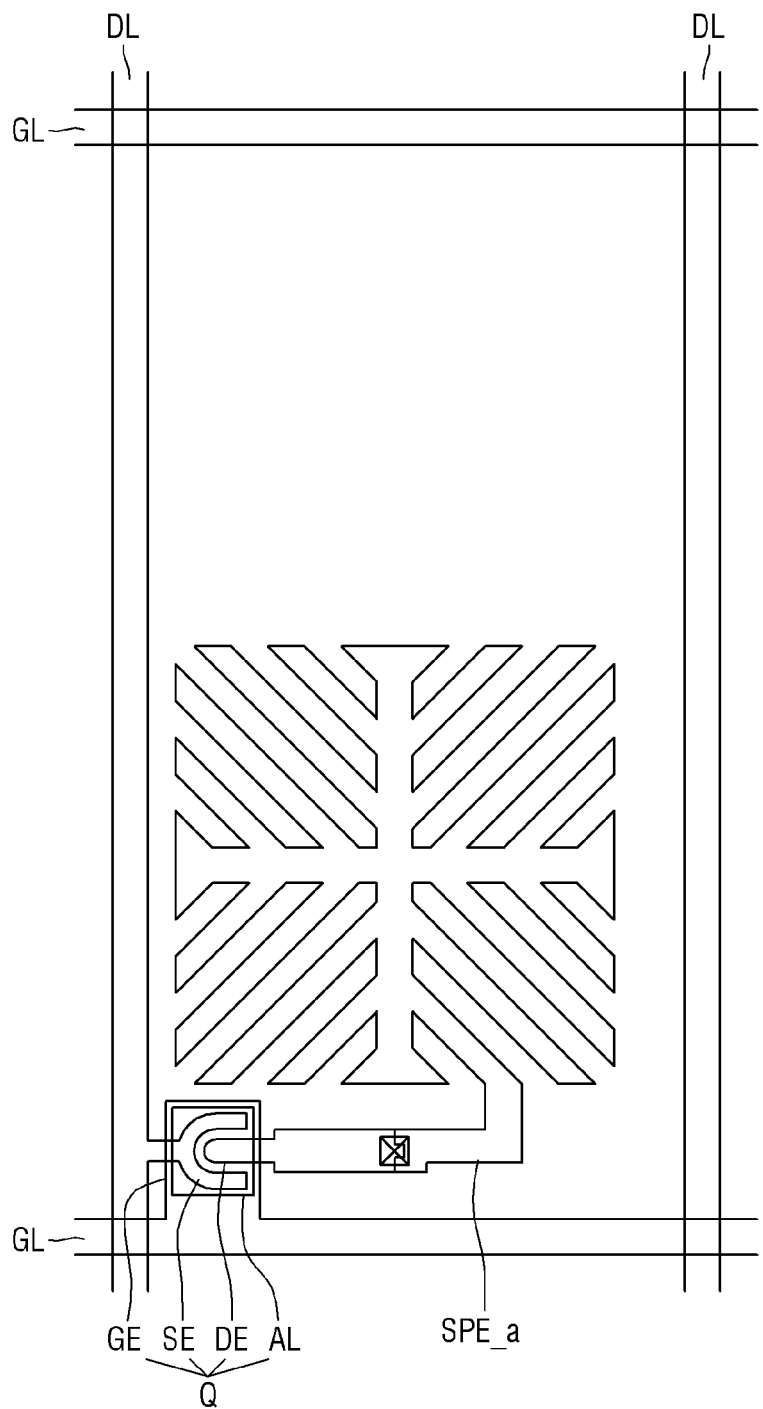
FIG. 14 is a plan view of a pixel shown in FIG. 9.

FIG. 8 to FIG. 12 are cross-sectional views illustrating a method of fabricating a liquid crystal display device according to an embodiment of the inventive concept, where each views corresponds to the cross-sectional surface taken along line I-I' of FIG. 3. FIG. 13 is a plan view of a pixel shown in FIG. 8. FIG. 14 is a plan view of a pixel shown in FIG. 9.

Figure 8:
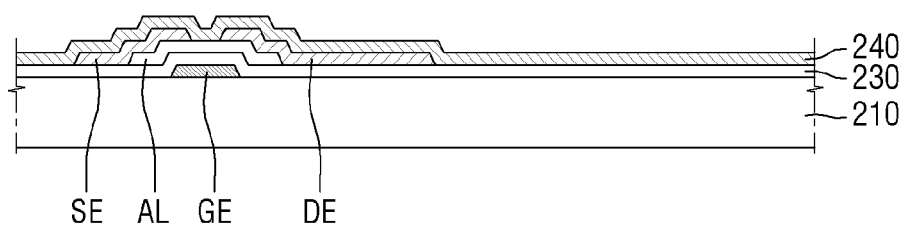
FIG. 8 to FIG. 12 are cross-sectional views illustrating a method of fabricating a liquid crystal display device according to an embodiment of the inventive concept, where each views corresponds to the cross-sectional surface taken along line I-I' of FIG. 3.

Referring to FIG. 8, in an embodiment of a method of fabricating a liquid crystal display device, the gate electrode GE, the first insulation layer 230, the semiconductor layer AL, the source electrode SE, the drain electrode DE and the second insulation layer 240 may be provided or formed on the first insulation layer 210. Components which have a specific pattern may be formed through a mask process, or other methods for forming a pattern may be employed. When components are formed to overlap the whole surface of the first insulation substrate 210 without having a specific pattern, the components may be formed by depositing or coating a specific material. A detailed description on such a mask process will be omitted.

In an embodiment, the drain electrode DE may be patterned to a shape including a protrusion PP. Specifically, referring to FIG. 13 which is a plan view of a pixel shown in FIG. 8, a terminal provided at the opposite side from the terminal in which the switching element is disposed may include the protrusion PP. The protrusion PP may be disposed adjacent to the first subpixel electrode SPE_a and the second subpixel electrode SPE_b, which will be described later, and a boundary at which the protrusion PP contacts the first subpixel electrode SPE_a and the second subpixel electrode SPE_b may be elongated, thus reducing the risk of faults such as short circuit. The protrusion PP may be plural in number, and may have a shape in which all outer sides thereof may not be straight lines. The protrusion PP may be formed into various shapes capable of elongating the boundary thereof contacting the first subpixel electrode SPE_a.

Figure 9:
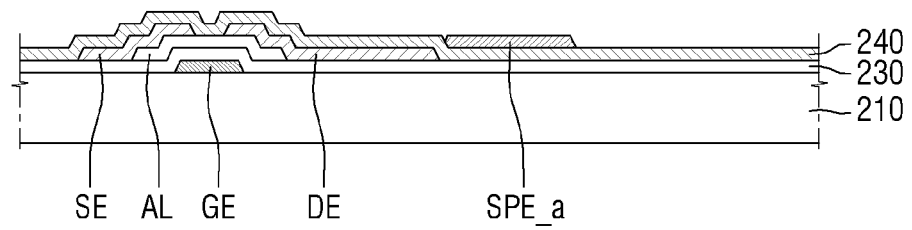

Referring next to FIG. 9, the first subpixel electrode SPE_a may be provided or formed on the first insulation layer 230. The first subpixel electrode SPE_a may be disposed adjacent to the drain electrode DE, and may perform a mask process for patterning thereof.

Referring to FIG. 14, which is a plan view of a pixel corresponding to FIG. 9, the first subpixel electrode SPE_a may be formed into a shape including a certain pattern constituted by a stem and branches in a light transmitting region, and may be arranged adjacent to the drain electrode DE. In such an embodiment, the first subpixel electrode SPE_a may be formed into a shape enclosing the protrusion PP of the drain electrode DE in the region adjacent to the drain electrode DE.

Figure 10:
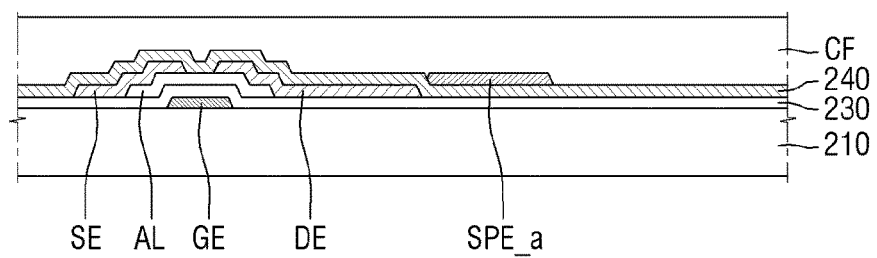

Referring next to FIG. 10, the third insulation layer CF may be provided or formed on the first subpixel electrode SPE_a, and the third insulation layer CF may be formed into a color filter layer CF. As described above, the color filter layer CF may pass light in a specific wavelength range, and may pass light in different wavelength ranges for each pixel PX.

Although not shown, the color filter layer CF may be provided or formed for the pixels PX that transmit light in the same wavelength range. If the pixels PX of the liquid crystal display device 1000 include a red pixel, a green pixel and a blue pixel, for example, the color filter layer CF may include a red color filter, a green color filter and a blue color filter, which may be provided using three masks for manufacture thereof. Furthermore, boundaries among the color filters may overlap the data line DL or the gate line GL.

Figure 11:
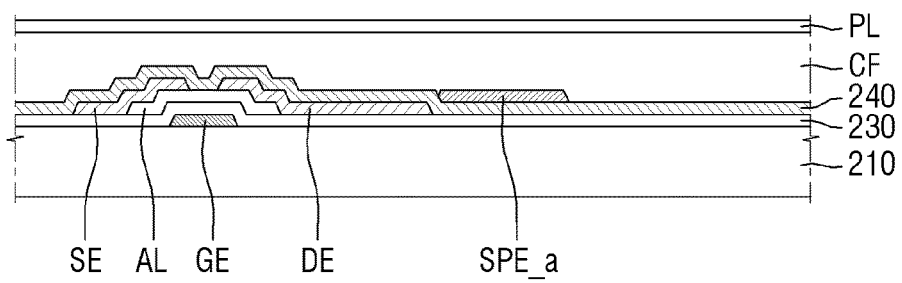

Referring next to FIG. 11, the passivation layer PL may be provided or formed on the color filter layer CF. In such an embodiment, the passivation layer PL may be the same as the passivation layer described above with reference to FIG. 4, and any repetitive detailed description thereof will be omitted.

Figure 12:
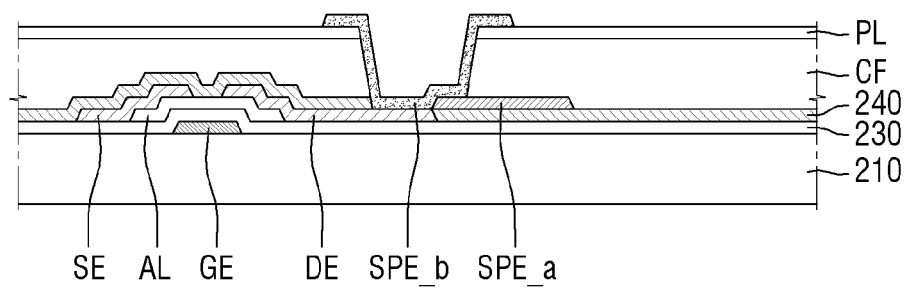

Referring next to FIG. 12, the contact hole CH for exposing both the drain electrode DE and the first subpixel electrode SPE_a may be formed in the region where the drain electrode DE and the first subpixel electrode SPE_a are adjacent to each other, and the second subpixel electrode SPE_b may be disposed on the passivation layer PL and the exposed portions of the drain electrode DE and the first subpixel electrode SPE_a. The drain electrode DE and the first subpixel electrode SPE_a may be interconnected by the second subpixel electrode SPE_b in the region exposed through the contact hole CH, and the second subpixel electrode SPE_b may have a pattern same as those shown in FIG. 3 when viewed on a plan.

The components shown in FIG. 3 may be further provided or formed after formation of the second subpixel electrode SPE_b, and a detailed description thereof will be omitted.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:
1. A liquid crystal display device comprising:
a first insulation substrate;
a first subpixel electrode disposed on the first insulation substrate;
a switching element interposed between the first insulation substrate and the first subpixel electrode, wherein a portion of an output terminal of the switching element and a portion of the first subpixel electrode are adjacent to each other;
an insulation layer disposed on the first subpixel electrode, wherein a contact hole is defined through the insulation layer to expose the portion of the output terminal of the switching element and the portion of the first subpixel electrode, which are adjacent to each other;

a second subpixel electrode disposed on the insulation layer, wherein a portion of the second subpixel electrode is disposed in the contact hole such that the portion of the second subpixel electrode is in contact with the exposed portion of the output terminal of the switching element through the contact hole and the exposed portion of the first subpixel electrode through the contact hole;

a liquid crystal layer disposed on the second subpixel electrode;

a common electrode disposed on the liquid crystal layer; and a second insulation substrate disposed on the common electrode, wherein the second subpixel electrode and the common electrode are spaced apart by a second distance in a second region in which the second subpixel electrode is disposed, the first subpixel electrode and the common electrode are spaced apart by a first distance in a first region in which the first subpixel electrode is disposed, and the first distance and the second distance are different from each other.

2. The liquid crystal display device of claim 1, wherein the first distance is longer than the second distance.

3. The liquid crystal display device of claim 2, wherein, when a same voltage is applied to the first subpixel electrode and the second subpixel electrode, an intensity of an electric field generated in the liquid crystal layer in the first region is less than an intensity of an electric field generated in the liquid crystal layer in the second region.

4. The liquid crystal display device of claim 3, wherein the liquid crystal layer comprises a plurality of liquid crystal molecules, and when the same voltage is applied to the first subpixel electrode and the second subpixel electrode, an angle between major axes of the liquid crystal molecules in the first region and an axis vertical to the first insulation substrate is smaller than an angle between major axes of the liquid crystal molecules in the second region and the axis vertical to the first insulation substrate.

5. The liquid crystal display device of claim 3, wherein, when the same voltage is applied to the first subpixel electrode and the second subpixel electrode, the first region displays brightness darker than brightness in the second region.

6. The liquid crystal display device of claim 2, wherein the first subpixel electrode is electrically connected to the second subpixel electrode.

7. The liquid crystal display device of claim 1, wherein the insulation layer comprises a color filter which passes only light in a predetermined wavelength range.

8. The liquid crystal display device of claim 7, further comprising:

a passivation layer interposed between the insulation layer and the second subpixel electrode.

9. The liquid crystal display device of claim 7, wherein a ratio between a thickness of the insulation layer and a thickness of the liquid crystal layer is about 1:1.

10. The liquid crystal display device of claim 1, wherein the first subpixel electrode and the second subpixel electrode do not overlap each other except in a region in which the contact hole is disposed.

11. The liquid crystal display device of claim 1, wherein the switching element comprises a control terminal electrically connected to a gate line extending in a first direction, an input terminal electrically connected to a data line extending in a second direction, and the output terminal electrically connected to the first subpixel electrode and the second subpixel electrode.

12. The liquid crystal display device of claim 11, wherein the output terminal of the switching element comprise a protrusion, wherein the protrusion is disposed adjacent to the first subpixel electrode.

13. The liquid crystal display device of claim 11, wherein the output terminal of the switching element is physically connected to the second subpixel electrode, and the second subpixel electrode is physically connected to the first subpixel electrode.

14. The liquid crystal display device of claim 1, wherein each of the first subpixel electrode and the second subpixel electrode comprises a stem disposed in a central region and a plurality of branches extending in four different directions from the stem.

15. A method of fabricating a liquid crystal display device, the method comprising:

preparing a first insulation substrate;

providing a switching element on the first insulation substrate;

providing a first subpixel electrode on the switching element, wherein a portion of an output terminal of the switching element and a portion of the first subpixel electrode are adjacent to each other;

providing an insulation layer on the first subpixel electrode; and forming a contact hole through the insulation layer to expose the portion of the output terminal of the switching element and the portion of the first subpixel electrode, which are adjacent to each other;

providing a second subpixel electrode on the insulation layer, wherein a portion of the second subpixel electrode is disposed in the contact hole such that the portion of the second subpixel electrode is in contact with the exposed portion of the output terminal of the switching element through the contact hole and the exposed portion of the first subpixel electrode through the contact hole, wherein the first subpixel electrode and the second subpixel electrode are in different layers from each other.

16. The method of claim 15, wherein the providing the insulation layer comprises providing a color filter which passes only light in a predetermined wavelength range.

17. The method of claim 16, further comprising:

providing a passivation layer on the insulation layer, wherein the providing the second subpixel electrode comprises providing the second subpixel electrode on the passivation layer.

18. The method of claim 15, wherein the providing the second subpixel electrode comprises electrically connecting the second subpixel electrode to the first subpixel electrode through the contact hole.

19. The method of claim 15, further comprising:

providing a gate line extending in a first direction on the first insulation substrate; and providing a data line extending in a second direction on the first insulation substrate, wherein an input terminal of the switching element is connected to the data line, and a control terminal of the switching element is connected to the gate line on the first insulation substrate.

* * * * *